US012516545B2

(12) United States Patent
Kölliker et al.

(10) Patent No.: US 12,516,545 B2
(45) Date of Patent: Jan. 6, 2026

(54) BLOCKING DEVICE FOR A CLOSURE ELEMENT OR A SWITCHING ELEMENT

(71) Applicant: DORMAKABA SCHWEIZ AG, Wetzikon (CH)

(72) Inventors: Marcel Kölliker, Wetzikon (CH); Franco Di Sario, Wetzikon (CH); Markus Zahner, Wetzikon (CH)

(73) Assignee: DORMAKABA SCHWEIZ AG, Wetzikon (AT)

(*) Notice: Subject to any disclaimer, the term of this patent is extended or adjusted under 35 U.S.C. 154(b) by 0 days.

(21) Appl. No.: 18/714,914

(22) PCT Filed: Dec. 2, 2022

(86) PCT No.: PCT/EP2022/084237

§ 371 (c)(1),
(2) Date: May 30, 2024

(87) PCT Pub. No.: WO2023/099747

PCT Pub. Date: Jun. 8, 2023

(65) Prior Publication Data

US 2024/0418008 A1 Dec. 19, 2024

(30) Foreign Application Priority Data

Dec. 3, 2021 (EP) .................................... 21212254

(51) Int. Cl.

| | |
|---|---|
| ***E05B 47/06*** | (2006.01) |
| ***E05B 27/00*** | (2006.01) |
| ***E05B 47/00*** | (2006.01) |

(52) U.S. Cl.

CPC ........ *E05B 47/063* (2013.01); *E05B 47/0012* (2013.01); *E05B 27/001* (2013.01); (Continued)

(58) Field of Classification Search

CPC ............. E05B 27/0082; E05B 29/0066; E05B 47/0005; E05B 47/0012; E05B 47/0611; (Continued)

(56) References Cited

U.S. PATENT DOCUMENTS 6,604,394 B2 * 8/2003 Davis .................. E05B 47/0615 70/369
7,640,773 B2 * 1/2010 Bellamy ............. E05B 47/0653 70/416
(Continued)

FOREIGN PATENT DOCUMENTS

| | | |
|---|---|---|
| EP | 2314809 A1 | 4/2011 |
| EP | 2927395 A1 | 10/2015 |
| EP | 1914368 B1 | 6/2018 |

OTHER PUBLICATIONS

International Search Report for Application No. PCT/EP2022/084237, dated Mar. 1, 2023, 2 pages.
(Continued)

*Primary Examiner* — Christopher J Boswell
(74) *Attorney, Agent, or Firm* — CANTOR COLBURN LLP

(57) ABSTRACT

A barrier device for a locking device is provided with a stator, with a rotor with a rotor axis and with an electromechanical actuator in the rotor. The rotor has two rotor elements, with the first rotor element and the second rotor element being arranged axially one behind the other in relation to the rotor axis. The two rotor elements are connected to each other in a rotationally fixed manner. The electromechanical actuator is arranged in one of the rotor elements. A locking device is provided with a locking device housing and the barrier device. The barrier device is received in the locking cylinder housing. In particular, the locking device includes a fastening element which is inserted from the outside into the locking device housing in order to fasten the stator to the locking device housing in a rotationally fixed manner.

15 Claims, 6 Drawing Sheets

(52) U.S. Cl.
CPC ................. *E05B 2047/0017* (2013.01); *E05B 2047/0084* (2013.01); *E05B 2047/0085* (2013.01)

(58) Field of Classification Search
CPC ............. E05B 47/0619; E05B 47/0626; E05B 47/063; E05B 2047/0017; E05B 2047/0084; E05B 2047/0085; H02K 5/04; H02K 16/02
See application file for complete search history.

(56) References Cited

U.S. PATENT DOCUMENTS

| | | | | |
|---|---|---|---|---|
| 7,698,919 | B2 * | 4/2010 | Kim | E05B 47/0642<br>70/277 |
| 7,966,854 | B2 * | 6/2011 | Imedio | E05B 47/0642<br>192/69.62 |
| 8,544,303 | B2 * | 10/2013 | Andersson | E05B 47/063<br>70/278.3 |
| 9,267,583 | B2 * | 2/2016 | Narovlansky | E05B 47/0611 |
| 9,909,340 | B2 * | 3/2018 | Bock | E05B 47/0692 |
| 10,145,147 | B2 * | 12/2018 | Ferreira | E05B 47/0615 |
| 10,533,345 | B2 * | 1/2020 | Green | E05B 47/0623 |
| 11,761,241 | B2 * | 9/2023 | Zhou | E05B 47/0653<br>70/278.7 |
| 2012/0260704 | A1 | 10/2012 | Ferreira Sanchez | |
| 2019/0153752 | A1 * | 5/2019 | Pagnoncelli | E05B 47/0626 |
| 2023/0258025 | A1 * | 8/2023 | Niegmann | E05B 47/0642<br>70/277 |

OTHER PUBLICATIONS

Written Opinion for Application No. PCT/EP2022/084237, dated Mar. 1, 2023, 3 pages.

* cited by examiner

BLOCKING DEVICE FOR A CLOSURE ELEMENT OR A SWITCHING ELEMENT

CROSS-REFERENCE TO RELATED APPLICATIONS

This application is a 35 U.S.C. § 371 National Stage patent application of PCT/EP2022/084237, filed on 2 Dec. 2022, which claims the benefit of European patent application 21212254.3. filed on 3 Dec. 2021, the disclosures of which are incorporated herein by reference in their entirety

TECHNICAL FIELD

The disclosure relates, on the one hand, to a barrier device for a closure element or a switching element according to the preamble of claim 1. Such a barrier device is provided with a stator, with a rotor with a rotor axis and with an electromechanical actuator in the rotor. The rotor has a first rotor element and a second rotor element, with the first rotor element and the second rotor element being arranged axially one behind the other in relation to the rotor axis. The first rotor element and the second rotor element are connected to each other in a rotationally fixed manner. The electromechanical actuator is arranged in one of the rotor elements. Furthermore, the disclosure relates to a locking device equipped with such a barrier device. Locking devices are available in numerous designs, for example in the form of a locking cylinder.

PRIOR ART

EP 1 914 368 B1 discloses a locking cylinder with a cylinder housing as a stator. The locking cylinder further comprises a rotor in which an electric motor is arranged. The electric motor moves a blocking element that can be brought into a release position and a blocking position, thereby enabling or preventing a movement of the rotor with respect to the stator. The rotor is designed as a monolithic component that can be inserted into the locking cylinder. The disadvantage of this is that the rotor can hardly be reduced in size and/or adapted to special conditions.

SUMMARY

The disclosure therefore reduces the size of the rotor of a generic barrier device, in particular to create a locking device provided with such a barrier device.

The advantages are achieved by the limitations of the independent claim. Advantageous further developments of the device are indicated in the dependent device claims, the description and in the figures. Furthermore, the advantage is also achieved by providing a locking device according to the claims. Advantageous further developments of the locking device are indicated in the description and in the figures. Features and details, which are described in connection with the barrier device according to the disclosure, also apply here in connection with the locking device according to the disclosure and vice versa. In this case, the features mentioned in the description and in the claims may each be essential to the disclosure individually by themselves or in combination.

A barrier device according to the disclosure for a closure element or for a switching element is provided with a stator, a rotor with a rotor axis and an electromechanical actuator in the rotor. The rotor has a first rotor element and a second rotor element. The first rotor element and the second rotor element are arranged axially one behind the other in relation to the rotor axis and are connected to each other in a rotationally fixed manner. The electromechanical actuator is arranged in one of the rotor elements.

According to the disclosure, the non-monolithic rotor elements are thus manufactured as individual rotor elements before assembly. This makes it possible to optimize the rotor elements with regard to the elements to be received or held. This also opens up the possibility of producing necessary structures on or in the rotor elements more easily and/or cost-effectively.

The rotor elements can be particularly well adapted for function and/or assembly. Due to the good adaptation, it is possible to optimize the barrier device according to the disclosure in terms of size or to adapt it to circumstances. For example, one rotor element may require higher material stability than the other rotor element.

In particular, the rotor elements can be reversibly detachably connected to each other. The reversibly detachable connection can be made by a form-fitting and/or force-fitting connection. The reversible detachability can be provided in particular in the direction of rotation, preferably also in the axial direction. That is to say that a defective rotor element can be replaced.

It can be provided that the first rotor element comprises a first fastening means and the second rotor element comprises a second fastening means, with the rotor elements being fastened to each other in the direction of rotation by the first and the second fastening means in a form-fitting and/or force-fitting manner, preferably in a form-fitting manner.

It can be provided that the first and the second rotor element are connected to each other at least indirectly in the axial direction by a form-fitting and/or force-fitting connection, preferably a form-fitting connection, for example a latching connection.

The barrier device can comprise a latching device, with the first rotor element and the second rotor element being connected to each other via the latching device. The latching device can provide the latching connection. For example, both the first rotor element and the second rotor element are clipped to the latching device.

The barrier device is preferably used to bolt a spatial area. In particular, the spatial area is fixed. For example, the spatial area can be a room in a building, for example an office, an apartment or a house, or a storage room, for example a cupboard, a mailbox, a chest, a box, a safe or a drawer. In particular, the barrier device serves to be inserted into a particularly door-like closure element, for example a front door, an apartment door, a room door, a cupboard door, a mailbox flap or the front of a drawer, or to be attached to a closure element. Preferably, the stator of the barrier device is at least indirectly connected to the closure element in a rotationally fixed manner.

The barrier device can have a driver or be connectable to a driver. A rotation of the rotor of the barrier device is used to rotate the driver.

The driver is preferably designed as an eccentric. The driver can be designed as a locking lug. It may be that a rotation of the driver in a first direction serves to transfer the closure element from an unbolted state to a bolted state. It may be that a rotation of the driver in a second direction serves to transfer the closure element from a bolted to an unbolted state. For example, the barrier device can be inserted at least indirectly into a mortise lock. In this case, turning the driver can cause the bolt of the mortise lock to move. For example, the rotation of the driver in a first direction can cause the bolt to extend and thus bring about the bolted state of the closure element. For example, a rotation of the driver in a second direction can cause the bolt to retract and thus bring about the unbolted state of the closure element.

Alternatively, the driver itself can act as a bolt. For example, the rotation of the driver in a first direction can cause the driver to assume a bolting position. The rotation of the driver in a second direction, for example, causes the driver to assume an unbolting position.

In a preferred embodiment, the barrier device is designed as an installation device. The installation device is designed to be inserted into a locking device housing of a locking device. Preferably, the installation device is fastened in the locking device housing in a rotationally fixed manner by means of a fastening element. Thus, in the assembled state of the locking device, the stator of the barrier device and the locking device housing can form a common fixed unit.

The locking device housing is used in particular for insertion into or attachment to the closure element. The locking device can be designed, for example, as a locking cylinder, in particular as a double cylinder or half cylinder, as a knob cylinder, as a furniture cylinder or as a padlock. In the case that the barrier device is designed as an installation device, the advantage of saving installation space by dividing the rotor into a first and a second rotor element according to the disclosure is particularly great.

The barrier device, in particular the rotor, can be connected or connectable to a knob or a key in order to transmit a mechanical torque to the rotor.

The barrier device can comprise a key channel. A key can be inserted into the key channel.

If the barrier device is designed as an installation device, it is preferably provided that the barrier device comprises a connecting section in order to be connected to a driver.

Alternatively, it can be provided that the barrier device itself can be designed as a locking cylinder, in particular as a double cylinder or half cylinder, as a knob cylinder, as a furniture cylinder or as a padlock. The stator is also used here as a housing for insertion into or attachment to the closure element.

Alternatively, the barrier device can be provided for a switching element. This means that the switching element can only be operated by authorized users. The driver can be used here to actuate a switch or button. Thus, the barrier device can be used in a switching element, in particular in a key switch, or can correspond to a key switch.

The electromechanical locking device comprises the electromechanical actuator. The actuator can in particular be designed as an electric motor.

The actuator is used to enable the driver to move when the rotor rotates. For this purpose, a block can be removed and/or a coupling can be adjusted.

For example, the barrier device can comprise a barrier element. In a first position, the barrier element prevents the rotor from rotating with respect to the stator. In a second position, the barrier element allows the rotor to rotate with respect to the stator. The barrier element can be moved between the first and the second position.

The barrier element can be movably mounted in the rotor. Preferably, the rotor comprises a linear guide for the barrier element. It can be provided that the stator comprises a barrier element recess into which the barrier element engages in the first position. In the second position, the barrier element is disengaged from the barrier element recess.

The actuator is used to enable the barrier element to be moved into the second position.

The barrier device can comprise an electronic control device, in particular a processor and/or a controller, to control the actuator. The control device can comprise an electronic memory.

The barrier device can comprise a transmission device. The transmission device can be designed as a transmitting and receiving unit, as a biometric sensor, as a keypad for inputting a PIN and/or as a contact element for making electrical contact with an in particular electronic key. The transmitting and receiving unit can be designed to communicate with a mobile unit, in particular a mobile telephone or a card, by wireless near-field communication, in particular RFID or Bluetooth Low Energy.

The transmission device can be used to send and/or receive electronic data that make it possible to determine a user's authorization to unbolt the spatial area or to actuate the switching element. For example, the transmission device can receive an authorization code and/or an authorization time window, which is verified by the control device. If the verification is completed with a positive result, the actuator can be controlled to enable a rotation of the driver.

Alternatively, the transmission device can transmit an opening command. Based on the opening command, the actuator can be controlled to enable a rotation of the driver. For example, based on the opening command, the barrier element can be moved electromechanically into the second position or the movement into the second position can be released electromechanically.

The transmission device is used in particular additionally or alternatively to transmit electrical energy to the barrier device. The electrical energy can be provided for actuating the actuator and/or the control device.

For example, the transmission device can be fastened to the latching device. Preferably, the transmission device is resiliently fastened to the latching device.

Preferably, the barrier device according to the disclosure comprises a blocking element. The actuator assembly can comprise an actuator assembly having the actuator, the barrier element and the blocking element.

It is preferably provided that the blocking element allows the movement of the barrier element from the first position into the second position in a release position and prevents the movement of the barrier element from the first position into the second position in a blocking position.

In particular, it can be provided that when the blocking element is in the release position, the rotation of the rotor enables a movement of the barrier element into the second position. In particular, the stator pushes the barrier element into the second position.

Preferably, the blocking element comprises a recess in which the barrier element is arranged in the second position. In the first position, however, the barrier element is outside the recess. In the release position, the blocking element is arranged such that the recess is located opposite the barrier element such that the barrier element can retract into the recess.

The actuator is preferably used to enable a movement of the blocking element from the blocking position into the release position. The actuator can thus move the blocking element into the release position and/or, for example, cause the blocking element to move into the release position by tensioning a spring.

The blocking element can, for example, be disc-shaped.

The blocking element can be movable, in particular rotatable, between the release position and the blocking position.

It can be provided that the blocking element is arranged on the output shaft of the actuator designed as an electric motor. Preferably, the actuator enables a rotation of the blocking element from the blocking position into the release position. Preferably, the actuator rotates the blocking element from the blocking position into the release position. This allows for a very space-saving design.

Preferably, it is provided that the first rotor element is arranged in a state in which the barrier element is installed in the closure element, from the perspective of a user in front of the second rotor element. From the user's perspective, the second rotor element is located behind the first rotor element. In other words, the first rotor element comprises a front side that faces the user in a state in which the barrier element is installed in the closure element. In other words, the second rotor element is located between the driver and the first rotor element and/or the second rotor element is designed to be arranged between the driver and the first rotor element.

Preferably, the stator has a base side. The base side is preferably designed to be directed inwards and/or towards a driver of the locking device or the barrier device in the installed state. The base side is preferably designed to face away from a key channel or knob.

The second rotor element and the base side are preferably designed in such manner that the second rotor element can be inserted into the stator from the base side. The second rotor element and the base side are preferably designed in such manner that the second rotor element can be inserted into the stator only from the base side.

In particular, the second rotor element can preferably be inserted into the stator from the base side without the first rotor element. Particularly preferably, the second rotor element can only be inserted into the stator from the base side without the first rotor element. The second rotor element is preferably mounted by simply pushing it in.

The second rotor element preferably comprises a projection which is formed in one piece with the rest of the second rotor element. According to the disclosure, the projection determines the axial position with respect to the stator, in particular in a spatial direction, in particular in the insertion direction. This is a particularly simple and space-saving method of mounting the second rotor element. Preferably, the second rotor element is designed without a particularly annular groove for receiving a retaining ring. Rather, the rotor element is fixed axially in at least one spatial direction by the one-piece projection.

It can be provided that a section of the stator surrounding the second rotor element has a greater wall thickness than a section of the stator surrounding the first rotor element. Alternatively or additionally, the first rotor element can have a larger diameter than the second rotor element.

This can enable the stator to provide at least one functionality. For example, the barrier element recess can be provided in the part of the stator that surrounds the second rotor element.

The stator can comprise a stator element having a first contact surface for moving the barrier element from the first position into the second position.

Preferably, the stator element is movably mounted in the rest of the stator.

Preferably, the stator element can be provided in the part of the stator that surrounds the second rotor element.

It can be provided that the stator has a second contact surface for the barrier element. The second contact surface is used to keep the barrier element in the first position. The second contact surface can be used to space the barrier element from the blocking element when it rests on the second contact surface. The second contact surface can preferably be provided in the part of the stator that surrounds the second rotor element.

The stator can comprise a stator insert element. Preferably, the stator insert element comprises the second contact surface. Additionally or alternatively, the stator insert element can comprise a guide surface for the stator element.

If the first rotor element is designed with a larger diameter than the second rotor element, it is possible for the first rotor element to have at least one special functionality. For example, the first rotor element can house the transmission device and/or the key channel.

In particular, it is provided that the stator compensates for a difference in the diameter of the first and second rotor elements. This makes it possible for the stator to be designed to be cylindrical, for example.

Alternatively or additionally, the first rotor element and/or the second rotor element is/are designed to be cylindrical. In particular, the second rotor element projects into the first rotor element. This creates a connection possibility at least for transmitting a torque between the first and the second rotor element.

It can be provided that the first rotor element comprises an end surface facing the second rotor element. The end surface can preferably determine the axial position with respect to the stator in at least one spatial direction, in particular in the insertion direction of the first rotor element. That is to say that the first rotor element is already positioned when inserted into the stator, which simplifies assembly.

Additionally or alternatively, the first rotor element is fixed axially in at least one direction, preferably in both axial directions, by a ring, for example a snap ring.

Preferably, it is provided that the first rotor element is made of a different material, in particular a harder and/or stronger material, than the second rotor element. In particular, the first rotor element can be made of a ceramic material and/or serve as a drilling protection. This has the advantage that the rotor has optimal properties at the various points in the stator.

In the barrier device according to the disclosure, it can be provided that the first rotor element detaches from the second rotor element at or upon a certain mechanical stress. This can be implemented in that one of the rotor elements, in particular the second rotor element, comprises a predetermined breaking point. This prevents greater damage in the event of a break-in. This also increases security against burglary, as a potential burglar can hardly gain access.

The second rotor element can be designed to be arranged in the installed state between the aforementioned driver and the first rotor element. The second rotor element can extend between the base side of the stator and the first rotor element. In this case, the second rotor element protrudes in particular beyond the base side.

The second rotor element preferably receives the electromechanical actuator and/or the control device for controlling the actuator. This makes it possible to arrange these elements as far away from the outside as possible in order to increase safety.

The second rotor element preferably receives the barrier element. Additionally or alternatively, the blocking element can be arranged in the second rotor element. Particularly preferably, an actuator group is arranged in the second rotor element, with the actuator group comprising the barrier element, the blocking element and the actuator.

Alternatively or additionally, the barrier device comprises a latching element for latching in at least one position of the rotor with respect to the stator and/or a removal protection element for preventing a key from being removed in at least one position of the rotor with respect to the stator. The latching element or the removal protection element is or are preferably arranged on the first rotor element and/or cooperate with the first rotor element.

The latching element can be arranged to be axially movable. This is made possible by the different radii of the rotor elements.

The installation device can also comprise at least one drill protection rod which is arranged in the first rotor element and in the second rotor element.

Preferably, the transmission device is arranged in the first rotor element, with in particular the first rotor element radially surrounding the transmission device. This protects the transmission device, in particular with regard to assembly.

The barrier device can comprise an extension element which is designed to move in a first direction axially to the rotor axis when a key is inserted and to move in a second direction counter to the first direction axially to the rotor axis when the key is removed. When the key is inserted, the extension element is located in an insertion position. When a key is removed, the extension element is located in a removal position. The extension element can extend the effective range of the key.

The extension element can in particular be linearly movable. In this case, the extension element can be called a slider.

For example, the key channel can be designed to be short. This is in particular conceivable if the barrier device is designed free of mechanical coding. For example, the key channel can be substantially limited to the first rotor element.

Alternatively or additionally, the barrier device can comprise the key channel which receives a key in the inserted state. The electromechanical actuator is preferably located behind the key channel. Additionally or alternatively, the electronic control device is located behind the key channel. Additionally or alternatively, the barrier element and/or the blocking element is located behind the key channel. This increases safety and/or saves installation space.

It is conceivable that a wall delimits the key channel at the rear. “Rear” is to be understood here from the perspective of the user who operates the barrier device. The wall protects the control device, the actuator, the blocking element and/or the barrier element from manipulation.

For example, the latching device can form the wall.

It is preferably provided that the extension element extends from the first rotor element to the second rotor element.

The extension element can be used to couple a driver to the rotor. In particular, the extension element is used to couple a driver to the second rotor element. The extension element can hereby move a coupling part into a coupling position. The movement of the extension element for moving the coupling part into the coupling position preferably occurs when a key is inserted into the key channel of the barrier device. It can be provided that in the insertion position of the extension element the coupling part is located in the coupling position.

It can be provided that the first rotor element radially surrounds the extension element. It can be provided that the second rotor element guides the extension element.

In particular, if the barrier device is designed as an installation device, the stator can comprise an opening which is designed to receive a fastening element passed through the locking device housing for the rotationally fixed fastening of the stator to a housing of the locking device. The opening is thereby arranged in particular radially to the second rotor element. Preferably, the opening is provided in the part of the stator that surrounds the second rotor element. This makes it possible to firmly fix the stator to the locking device.

A locking device according to the disclosure comprises a locking device housing and a barrier device designed as an installation device. The installation device is received in the locking cylinder housing, with in particular the locking device comprising a fastening element, with the fastening element being inserted from the outside into the locking device housing in order to fasten the stator to the locking device housing in a rotationally fixed manner. The fastening element can be designed as a screw or a pin, for example.

BRIEF DESCRIPTION OF THE DRAWINGS

The disclosure will be described below in more detail on the basis of exemplary embodiments. Technical features with identical functions are provided with identical reference numerals in the figures. They show.

DETAILED DESCRIPTION OF THE DRAWINGS

Figure 1:
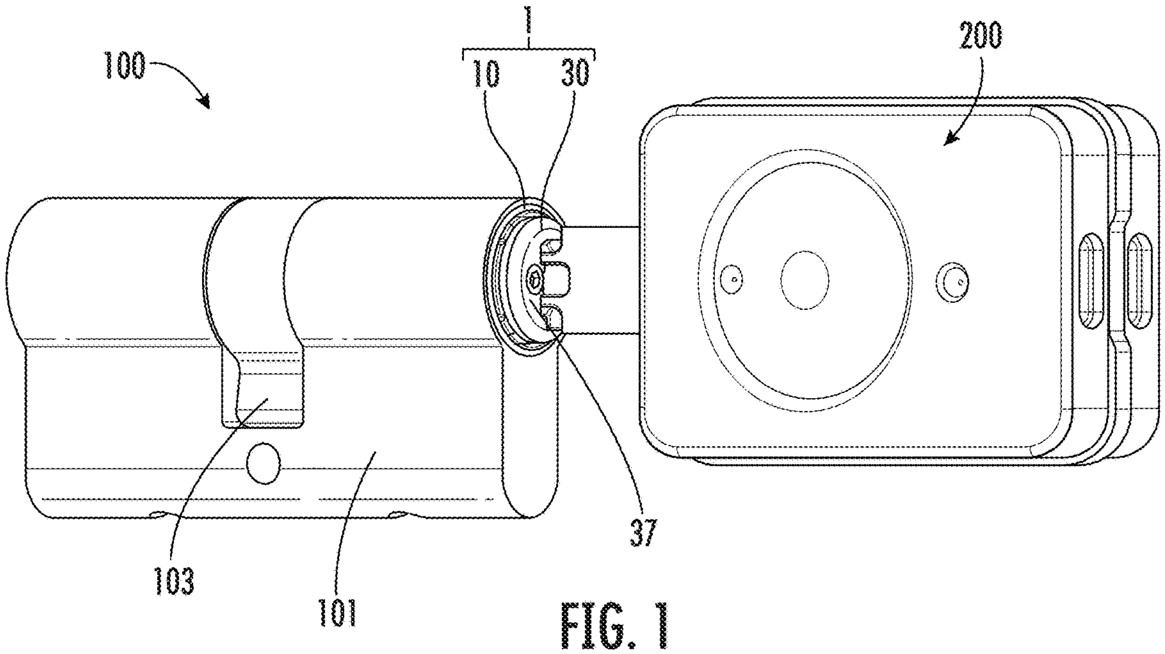
FIG. 1 a locking device according to the disclosure with a barrier device according to the disclosure and a key, FIG. 2 the locking device from FIG. 1, partially disassembled, FIG. 3 the barrier device from FIG. 2 designed as an installation device, which is also part of a locking device according to the disclosure, without a cover, FIG. 4 the installation device from FIG. 3 without a cover, stator body and coupling part in partially dismantled state, FIGS. 5 and 6 selected elements of the installation device from FIG. 4, FIG. 7 a barrier device according to the disclosure in accordance with a second exemplary embodiment in a partially dismantled state without a cover, stator body and coupling part, FIG. 8 a longitudinal section through the barrier device according to FIG. 7, and FIG. 9 a second rotor element of the barrier device from FIG. 7.

FIG. 1 shows a locking device 100 in the form of a locking cylinder, as used in mortise locks, in order to be able to unbolt or bolt a building door as a closure element by means of a bolt. For this purpose, the locking device 100 has a housing 101 with a recess in which a driver 103, which is designed as a locking lug, is rotatably arranged. The driver 103 is used to move a bolt in the bolting or unbolting direction.

In the right half of the housing 101 is inserted a barrier device 1 designed as an installation device in accordance with a first exemplary embodiment of the disclosure. The installation device 1 comprises a stator 10 arranged on the outside circumference, in which a rotor 30 of the installation device 1 is inserted so as to be rotatable about a rotor axis 35, which, for example, corresponds to the axis of rotation of the driver 103. The rotor 30 comprises, on its front side 37 facing away from the driver 103, a key channel 36 for inserting a shaft of a key 200. The key 200 carries an electronic secret locking code in the form of electronic data. The secret locking code can be used to determine a user's authorization to unbolt the door. The key 200 is preferably designed without a mechanical coding. Accordingly, the barrier device 1 according to the disclosure is designed without a mechanically coded tumbler. Therefore, only the electronic secret locking code can be used to determine whether or not the user has authorization. The keys and the barrier devices can be mechanically identical to each other.

Figure 2:
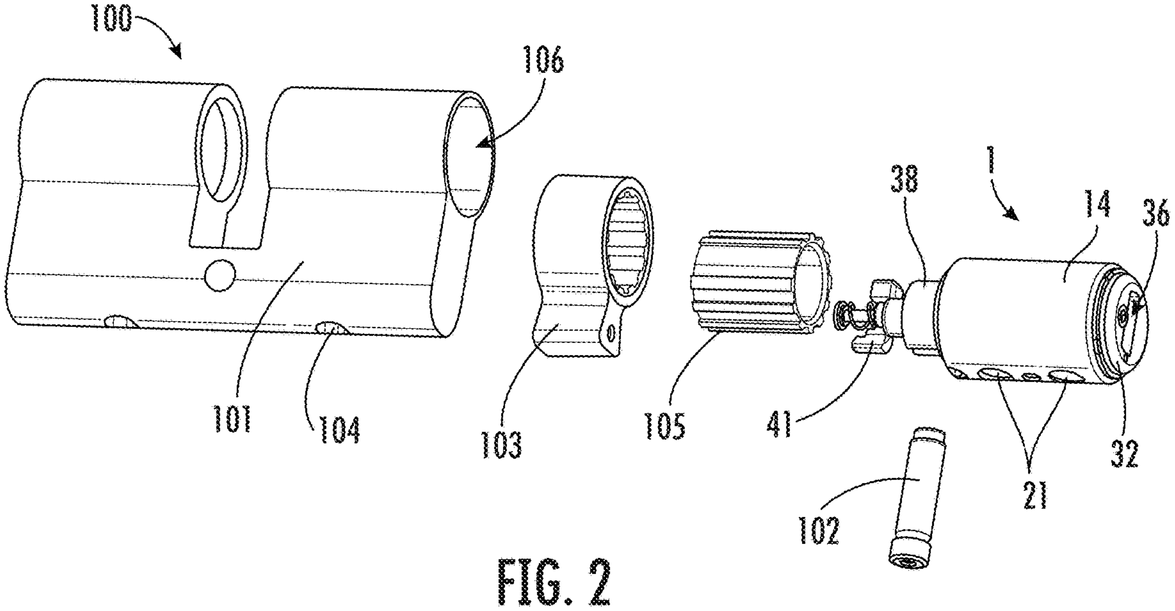

FIG. 2 shows the locking device 100 partially disassembled. The housing 101 has, for example in both halves of the recess for the driver 103, through-openings 104 in the lower area, of which the right through-opening is provided with a reference numeral. The through-openings 104 here extend perpendicular to the axis of rotation of the driver 103.

The driver 103 has, for example, an inner contour that is not circular in cross-section, for example in the form of an internal toothing, into which an insert 105 preferably engages in a form-fitting manner. For this purpose, the insert 105 has an outer contour that is preferably complementary to the inner contour of the driver 103, here in the form of an external toothing, such that both parts 103, 105 are arranged in a rotationally fixed manner with respect to each other.

A connecting section 38 of the installation device 1 projects into the insert 105. In the connecting section 38, a coupling part 41 is arranged in a guide 42 so as to be slidable. The coupling part 41 is made up of a plurality of parts. Depending on the position of the coupling part 41, the coupling part 41 can establish or release an operative connection between the rotor 30 and the driver 103, in particular via the insert 105. For this purpose, the coupling part 41 of the locking device 100 can engage in a form-fitting manner into an inner contour of the insert 105 not represented. The guide 42 preferably forms a linear guide for the coupling part 41 such that the coupling part 41 is arranged to be movably guided along the rotor axis 35 of the rotor 30.

The installation device 1 has a cover 14 with which the installation device 1 is inserted into an associated insertion opening 106 of the housing 101. A fastening element 102 in the form of a screw is screwed through the through-opening 104 on the right here from the underside of the housing 101 and into an opening 21 of the cover 14 of the stator 10 on the left here and of a stator body 11 of the stator 10, which will be explained in more detail later. The screw 2 thus fixes the stator 10 in the housing 101. Furthermore, the key channel 36 for inserting the key 200 is designated here, which is formed in a first rotor element 32 of the rotor 30.

The rotor 30 is freely rotatable in the stator body 11 of the stator 10, but is mounted stationary in the direction of its rotor axis 35, which runs parallel to the insertion direction of the key 200 into the key channel 36.

Figure 3:
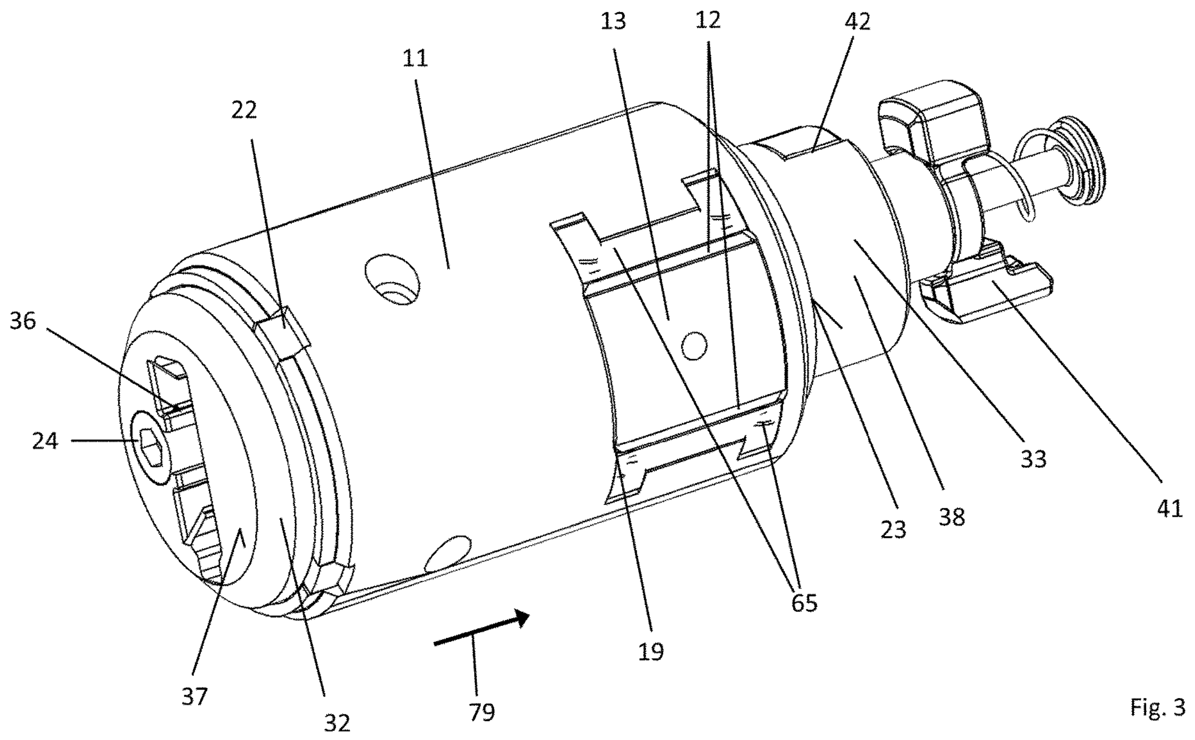

FIG. 3 shows that according to the disclosure the rotor 30 comprises a first rotor element 32 and a second rotor element 33. In FIG. 3, the installation device 1 is represented here without the cover 14.

During assembly, the first rotor element 32 can be inserted into the stator 10 from the front side 37. The first rotor element 32 is fixed axially to the driver 103 in the direction of arrow 79 by an end surface 66 (see FIG. 4) facing the second rotor element 33. Here, the end surface 66 rests on an inner structure of the stator 10, in particular of the stator body 11.

A circumferential projection 43 (see FIG. 4) of the second rotor element 33, here as a collar, serves as a stop of the second rotor element 33 on the stator 10. The second rotor element 33 can be inserted from a base side 23 of the stator 10 until the projection 43 rests on the base side 23. The projection 43 is preferably formed in one piece with the second rotor element 33. Due to the one-piece design, the second rotor element 33 can only be inserted into the stator 10 from the base side 23.

By the projection 43 resting on the base side 23, the second rotor element 33 is fixed axially towards the front side 37 counter to the direction of the arrow 79. The second rotor element 33 is inserted into the stator 10 from a base side 23 of the stator 10 during assembly without the first rotor element 32.

After insertion, the first and second rotor elements 32, 33 are connected to each other in a rotationally fixed manner, in particular in a reversibly detachable manner. Due to the division into rotor elements 32, 33, assembly of the rotor 30 is particularly easy. By connecting the two rotor elements 32, 33, the resulting rotor 30 is axially fixed forwards and backwards, i.e. with and against the direction of arrow 79.

Both rotor elements 32, 33 are reversibly detachably fastened to each other, for example by means of a screw 24, and arranged to be freely rotatable in the stator body 11.

The rotor elements 32, 33 are designed to be cylindrical. The first rotor element 32 has an inner contour into which the second rotor element 33 is inserted.

The rotor elements 32, 33 can be made of different materials. For example, the first rotor element 32 is made of a harder or more wear-resistant material than the second rotor element 33. This is in particular useful because the first rotor element 32 is designed to receive the key 200 and is therefore exposed to greater mechanical loads than the second rotor element 33. This also makes it easy to provide drilling protection. For example, the first rotor element 32 can be made of a ceramic material.

The coupling part 41 is arranged in a rotationally fixed manner on the second rotor element 33 of the rotor 30 of the installation device 1. The second rotor element 33 has the guide 42 into which the coupling part 41 engages and is thus arranged in a rotationally fixed manner in relation to the second rotor element 33.

The stator body 11 is designed to be sleeve-like. The first rotor element 32 has a larger diameter than the second rotor element 33. As a result, the part of the stator body 11 that surrounds the second rotor element 33 is formed with a greater wall thickness than the part of the stator body that surrounds the first rotor element 32.

The design of both the first rotor element 32 and the second rotor element 33 matches their functions.

On the one hand, the opening 21 is provided in the part of the stator 10 that surrounds the second rotor element 33. The opening 21 is formed both in the cover 14 and in the stator body 11. Here, the opening 21 is formed in the part of the stator 10 with the greater wall thickness, such that a secure fastening of the installation element 1 in the locking device housing 101 is provided. Preferably, a plurality of openings are provided in order to fasten the installation device 1 in different locking device housings 101 (see FIG. 8).

The second rotor element 33 houses an actuator assembly 50. The actuator group 50 comprises an electromechanical actuator 52, here in the form of an electric motor, on whose output shaft a blocking element 51 is arranged in a rotationally fixed manner. The blocking element 51 comprises a recess 54, which will be explained in more detail later. In addition, the second rotor element 33 houses an electronic control device 53 for controlling the actuator 52.

A barrier element 31 is mounted in the second rotor element 33, preferably perpendicular to the rotor axis 35, so as to be movable towards and away from the blocking element 51. In a first position shown in FIG. 5, the barrier element 31 is located in a barrier element recess 15 (see FIG.

5), which is formed by a stator insert element 13 and stator elements 12. As a result, the second rotor element 33 and thus the coupling part 41 are prevented from being rotated with respect to the stator 10. Turning the inserted key 200 to unbolt the corresponding lock is blocked or prevented. In a second position of the barrier element 31 not represented, the barrier element 31 is disengaged from the barrier element recess 15 of the stator 10. This makes it possible to rotate the rotor 30 in the stator 10 and thus the driver 103.

The barrier element 31 is pushed into the first position by at least one spring 34, preferably a plurality of springs 34. In the exemplary embodiment of FIG. 5, a plurality of springs 34 are provided.

The stator elements 12 and the stator insert body 13 are arranged in the section of the stator 10 that surrounds the second rotor element 33. Due to the small diameter of the second rotor element 33, it is possible to provide the movable stator elements 12 in the stator 10.

Figure 5:
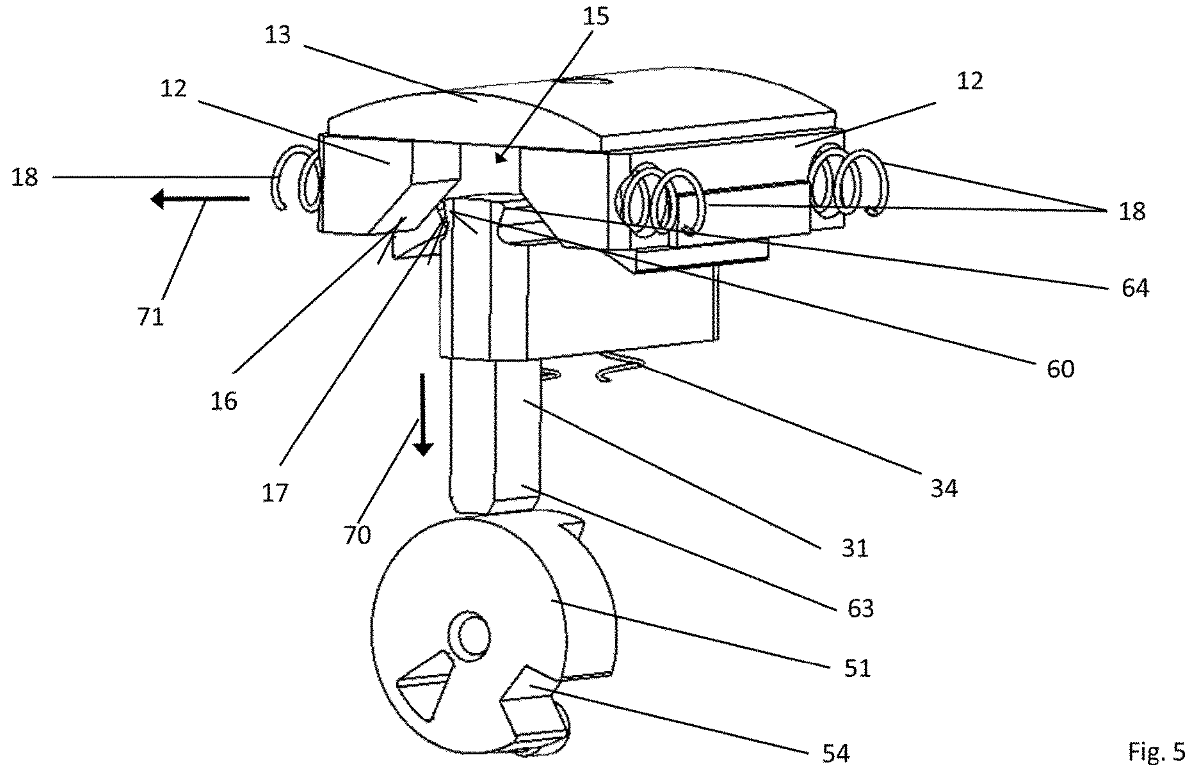
Figure 4:
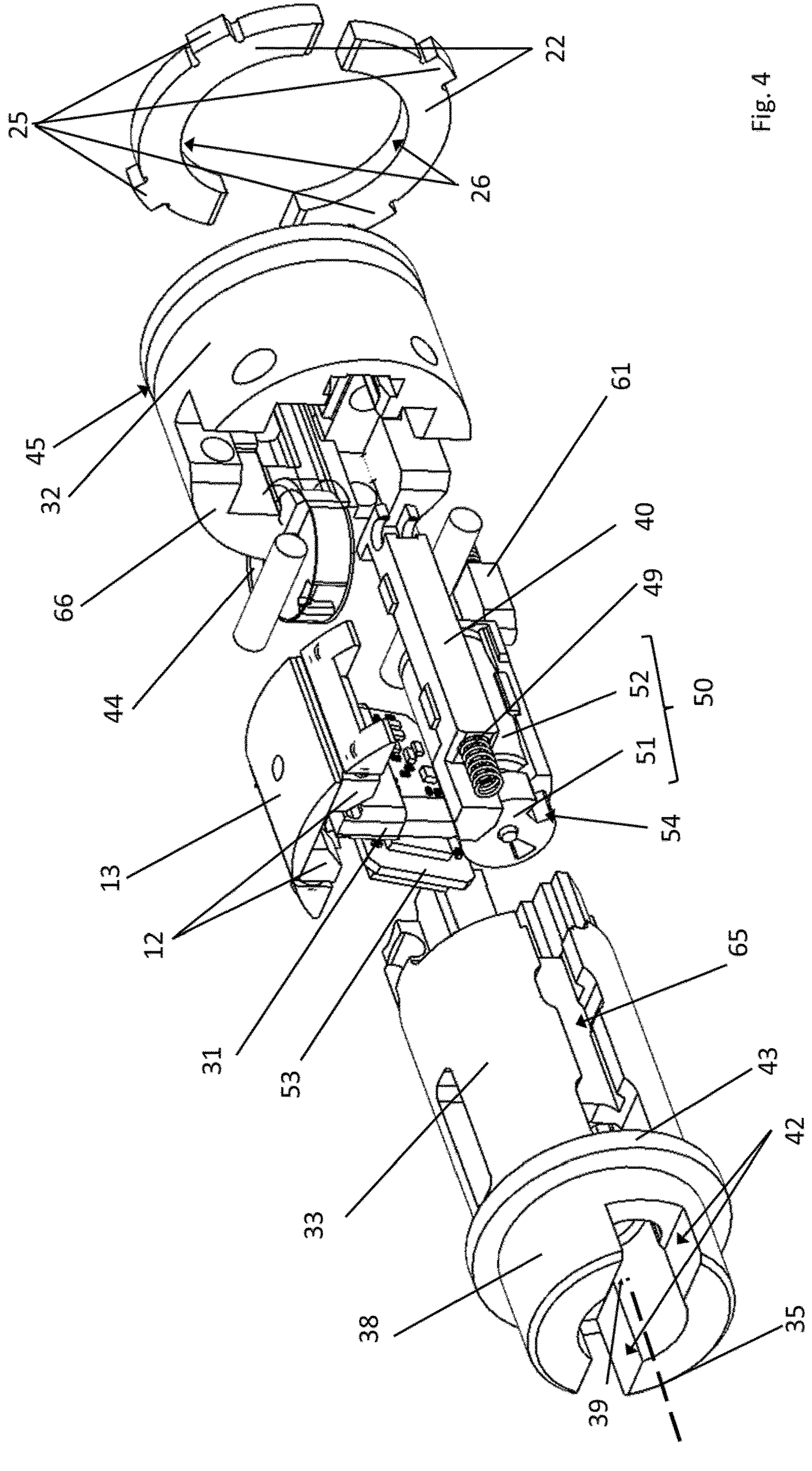

The blocking element 51 is rotatable between a release position in which the recess 54 is located opposite the barrier element 31 such that the barrier element 31 can retract into the recess 54 and blocking positions in which the recess 54 is not located opposite the barrier element 31 such that the barrier element 31 is prevented from retracting into the recess 54. FIGS. 4 and 5 show blocking positions of the blocking element 51.

The barrier element 31 is designed at its contact section 63 facing the blocking element 51 to be able to retract into the recess 54 when the blocking element 51 is located in the release position and the recess 54 is located opposite the contact section 63 of the barrier element 31, i.e. points upwards in FIG. 5. This makes it possible for the barrier element 31 to move into the second position.

A first contact surface 16 of the stator elements 12 facing the barrier element 31 is designed to push the barrier element 31 in the direction of the blocking element 51 when the rotor 30 rotates, i.e. into the second position in which the rotor 30 is freely rotatable with respect to the stator 10. The first contact surface 16 is designed as an inclined surface which pushes the barrier element 31 into the second position.

The stator elements 12 are movably mounted on the stator insert element 13 between a first position and a second position. The stator elements 12 are pushed into the first position by means of spring elements 18. The spring elements 18 are mounted in the stator 10. The movement of the stator elements 12 from the first position into the second position according to the movement direction 71 is perpendicular to the movement direction 70 of the barrier element 31.

During a process for unlocking the rotor 30 with respect to the stator 10, the barrier element 31 is initially located in the barrier element recess 15. Here, the barrier element 31 is guided linearly in the second rotor element 33. In addition, the barrier element 31 rests on the first contact surfaces 16 of the stator elements 12. This centers the barrier element 31. This position of the barrier element 31 is called the rest position. In the rest position, the barrier element 31 is preferably arranged spaced apart from the blocking element 51.

A user now wants to unbolt the door and inserts the key 200 into the key channel 36. This starts an electronic communication between the key and the control device 53, which electronically determines whether the user is authorized.

If the user is authorized to unbolt the door, the control device 53 controls the actuator 52. The actuator 52, designed as an electric motor, rotates the blocking element 51 into the release position in which the recess 54 is located opposite the barrier element 31. If the rotor 30 is now started to rotate by means of the key 200, the barrier element 31 slides along one of the first contact surfaces 16 into the second position in which the barrier element 31 engages into the recess 54. The springs 34 are tensioned here. The barrier element 31 is moved in the movement direction 70.

The stator elements 12 remain in the first position here. This is made possible by the fact that the spring elements 18 exert a greater force on the stator element 12, along which the barrier element 31 slides, than the springs 34 exert on the barrier element 31.

The rotor 30 can now rotate freely. The barrier element 31 slides along the first of the contact surfaces 16 into which the barrier element 31 is rotated. The barrier element 31 is surrounded by the first contact surfaces 16 in both directions of rotation such that the rotation in both directions when it rests on one of the first contact surfaces 16 causes the barrier element 31 to move into the second position. In order to provide first contact surfaces 16 in both directions of rotation, the barrier element recess 15 is surrounded on both sides by stator elements 12.

The stator 10 has second contact surfaces 17, which leave the barrier element 31 in the first position. The second contact surface 17 is used functionally when the user is not authorized to unbolt the door. The second contact surfaces 17 are formed in the stator insert element 13. If the barrier element 31 is located in the rest position, the second contact surfaces 17 are further away from the barrier element 31 than the first contact surfaces 16.

Preferably, the second contact surfaces 17 are also inclined, but opposite to the first contact surfaces 16 in relation to the movement direction 70 of the barrier element 31.

At its end facing the stator insert element 13, the barrier element 31 has, as seen along the axis of rotation of the blocking element 51 and/or the rotor axis 35, a cross-section which has the shape of a preferably symmetrical trapezoid tapering in the direction of the blocking element 51. The legs of this trapezoid form head surfaces 60 on the outside in relation to the barrier element 31. The head surface 60 and the corresponding contact surface 17 are inclined to the movement direction of the barrier element 31.

If the user is not authorized to unbolt the door, the following procedure occurs. The barrier element 31 is initially located in the rest position. A key 200 without locking authorization is inserted into the key channel 36. The electronic data exchange shows that there is no authorization to unbolt the door. Therefore, the actuator 52 is not activated and the blocking element 51 remains in a blocking position in which the recess 54 is not located opposite the barrier element 31, as represented in FIGS. 4 and 5. Rather, an outer circumference of the blocking element 51 is located opposite the barrier element 31.

If the rotor 30 is rotated, the barrier element 31 tries to slide along the first contact surface 16. However, this is not possible because the barrier element 31 rests on an outer circumference of the barrier element 31. Thus, the barrier element 31 cannot be pushed into the second position against the force of the springs 34.

Instead, the stator element 12, which is located in the direction of rotation of the barrier element 31, is pushed back by the barrier element 31 against the force of the spring 18 until the barrier element 31 rests on the second contact surface 17. The stator element 12 is now located in the second position.

In this case, the head surface 60 of the barrier element 31 comes into contact with the corresponding second contact surface 17 located opposite one of the legs of the trapezoid.

In this state, the stator element 12 or the stator elements 12 have been moved back in the direction of rotation against the force of a spring element 18. The spring element 18 presses the stator element 12 against the barrier element 31 as the rotor 30 continues to rotate.

The contact surface 17 is designed in such manner that the contact surface 17 holds the barrier element 31 in the first position. Thus, the rotor 30 remains blocked by the barrier element 31, such that the door cannot be unbolted.

Every second contact surface 17 corresponds to a respective head surface 60 of the barrier element 31 facing it. The surface 60 and the respectively corresponding contact surface 17 are designed in such manner that the contact surface 17 is located between the surface 60 and the blocking element 51 when the barrier element 31 rests on the contact surface 17.

If an attempt is made to rotate the rotor 30 further, the barrier element 31 slides away from the blocking element 51 counter to the movement direction 70. This is achieved by the inclination of the second contact surface 17. The barrier element 31 can slide with the head surface 60 along the second contact surface 17. Thus, the barrier element 31 and the blocking element 51 can be spaced apart from each other when they rest on the second contact surface 17. Additionally or alternatively, the forces acting on the barrier element 31 during further attempted rotation of the rotor 30 are diverted into the second contact surface 17. This is helped by the fact that the head surfaces 60 correspond to the second contact surfaces and thus the barrier element 31 rests flat on the second contact surface.

Figure 6:
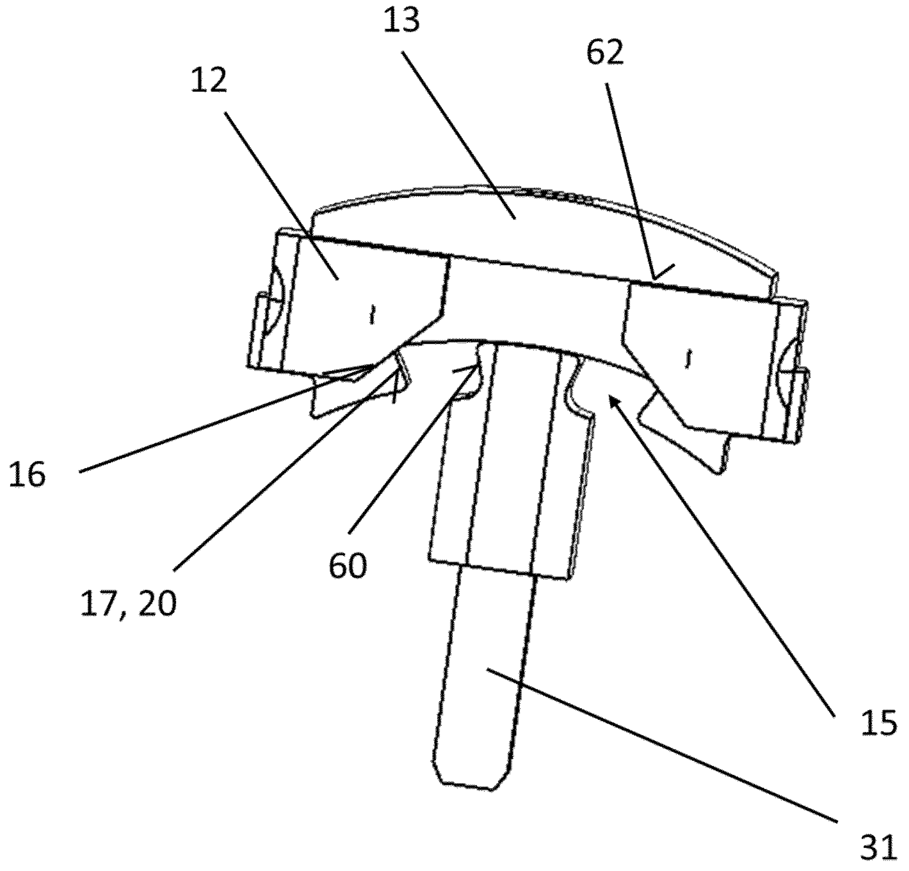

In FIG. 5, the barrier element recess is provided with the reference numeral 15. FIG. 6 shows the arrangement of FIG. 5 seen from one end of the barrier element 31, only without blocking element 51. Here, the stator elements 12 are located in the second position.

The barrier element 31 is surrounded by the second contact surfaces 17 in both directions of rotation, such that the rotation in both directions when it rests on one of the second contact surfaces 17 leaves the barrier element 31 in the first position.

In the first position of the stator elements 12, the first contact surfaces 16 are located closer to the barrier element 31 than the second contact surfaces 17. In the second position of the stator elements, the second contact surfaces 17 protrude further into the barrier element recess 15 than the first contact surfaces 16.

The barrier element 31 is formed in one piece. As a result, first contact sections 64 of the barrier element 31, which are used to engage the first contact surfaces 16, are rigidly connected to the head surfaces 60, which are used to contact the second contact surfaces 17. The head surfaces 60 serve as second contact sections. The first and second contact sections 60, 64 are rigidly connected to the third contact section 63 of the barrier element, which serves for contact in the recess 54.

The stator elements 12 and the stator insert body 13 are arranged in the section of the stator 10 that surrounds the second rotor element 33. Due to the small diameter of the second rotor element 33, it is possible to provide the first and second contact sections 16, 17 in the stator 10.

The assembly of the installation element 1 is facilitated by the stator comprising a stator body 11 and a stator insert element 13. The cover 14 serves to fasten the stator insert element 13 in the stator body 11. The stator body 11 has a stator recess 19 into which a stator insert element 13 is inserted.

FIG. 5 shows selected elements of the installation device 1 from FIG. 4. FIG. 5 thereby shows the arrangement of the barrier element 31 in relation to the blocking element 51 and the stator insert element 13 together with stator elements 12.

FIG. 4 shows the installation device 1 without cover 14 and without stator body 11 in a partially dismantled state.

A transmission element 44, here for example in the form of a coil, is provided to establish a data and/or energy transmission connection with the key 200. This makes it possible to read electronic data, for example authentication information or an opening command, from the key 200 or to receive it from the key 200. The electronic control device 53 is coupled to the transmission element 44 in order to read out the data and, if necessary, evaluate it. If the check of the control device 53 shows that the user of the key 200 is authorized to open the associated door and/or if the control device 53 has an opening command, an electromechanical actuator assembly 50 will be activated.

The transmission element 44 is arranged in the first rotor element 32.

The key channel 36 is provided in the first rotor element 32. Thus, the key channel 36 ends before the actuator 52. The key channel 36 ends before the control device 53. This increases the security against manipulation.

An extension element 40 is intended to interact mechanically with the key 200. The short key channel 36 extends the effective range of the key 200. If the key 200 is pushed into the key channel 36, it moves the extension element 40 axially or parallel to the rotor axis 35 into an insertion position upon contact.

Preferably, the extension part 40 thereby moves the coupling part 41 away from the rotor 30 in the direction of the driver 103 such that the coupling part 41 can come into rotational engagement with the driver 103. A passage 39 is provided in the connecting section 38 such that the extension element 40 can come into contact with the coupling part 41. Either the extension element 40 or the coupling part 41 can protrude through the passage 39 here.

When the key 200 is removed, the extension element 40 moves axially to the rotor axis in a second direction opposite to the first direction into a removal position. The extension element 40 is pushed into the removal position by a spring 49.

The extension element 40 extends from the first rotor element 32 to the second rotor element 33. As a result, the extension element bridges a gap between the key 200 and the coupling part 41.

The first rotor element 32 surrounds the extension element 40 radially.

The second rotor element 33 comprises a guide 65 to axially guide the extension element 40 between the removal position and the insertion position.

The extension element 40 is angled in the example shown. In this case, a first part of the extension element 40, which is intended for interaction with the key 200, extends radially further outward than a second part of the extension element 40, which is intended for interaction with the coupling part 41. This allows the second part to be arranged more centrally in order to be able to push the coupling part 41 better.

The extension element 40 is designed to push the coupling part 41, but without being in form-fitting engagement with the coupling part 41. This allows the extension element to be designed in a filigree manner.

The extension element 40 serves to return the blocking element 51 mechanically and/or magnetically from the release position to the blocking position. The extension element 40 can be moved back into the removal position when the key is removed. When the extension element moves into the removal position, a movement of the blocking element 51 into the blocking position can be caused or permitted. For example, a spring, not represented, can be tensioned during the movement of the blocking element 51 into the release position. When the key is inserted in the insertion position, the extension element 40 holds the blocking element 51 in the release position and allows the blocking element 51 to move back into the blocking position when the extension element 40 moves with the key 200 in the direction of the front side 37 when the key is removed.

A latching element 61 is provided which holds the rotor 30 in position with respect to the stator 10. The latching element 61 is formed by means of a spring-loaded latching lug by way of example. In this case, a rotation of the rotor 30 is inhibited by the latching element 61 in the stator in such manner that the barrier element 31 can assume the rest position. That is to say that the rotor 30 can overcome the latching lug 61 when rotating such that the function of the rotor 30 is maintained. The latching lug 61 provides haptic feedback to the user that a desired position has been reached. The latching element 61 is provided on the first rotor element 32. The latching element 61 is arranged to be axially movable. The axial mobility of the latching element 61 is made possible by the different diameters of the rotor elements 32, 33.

An annular projection 22 is formed in particular by means of half-shell-like parts, whose inner surfaces 26 facing each other cooperate with the key 200 in the manner of a bayonet lock. The parts are inserted into a circumferential groove 45 of the first rotor element 32. Outwardly protruding projections 25 of the annular projection 22 fix the parts of the projection 22 in the stator body 11 in their relative position to one another and to the stator body 11. The annular projection 22 acts with the inserted key 200 preferably in a bayonet-like manner as a key removal lock.

Figure 7:
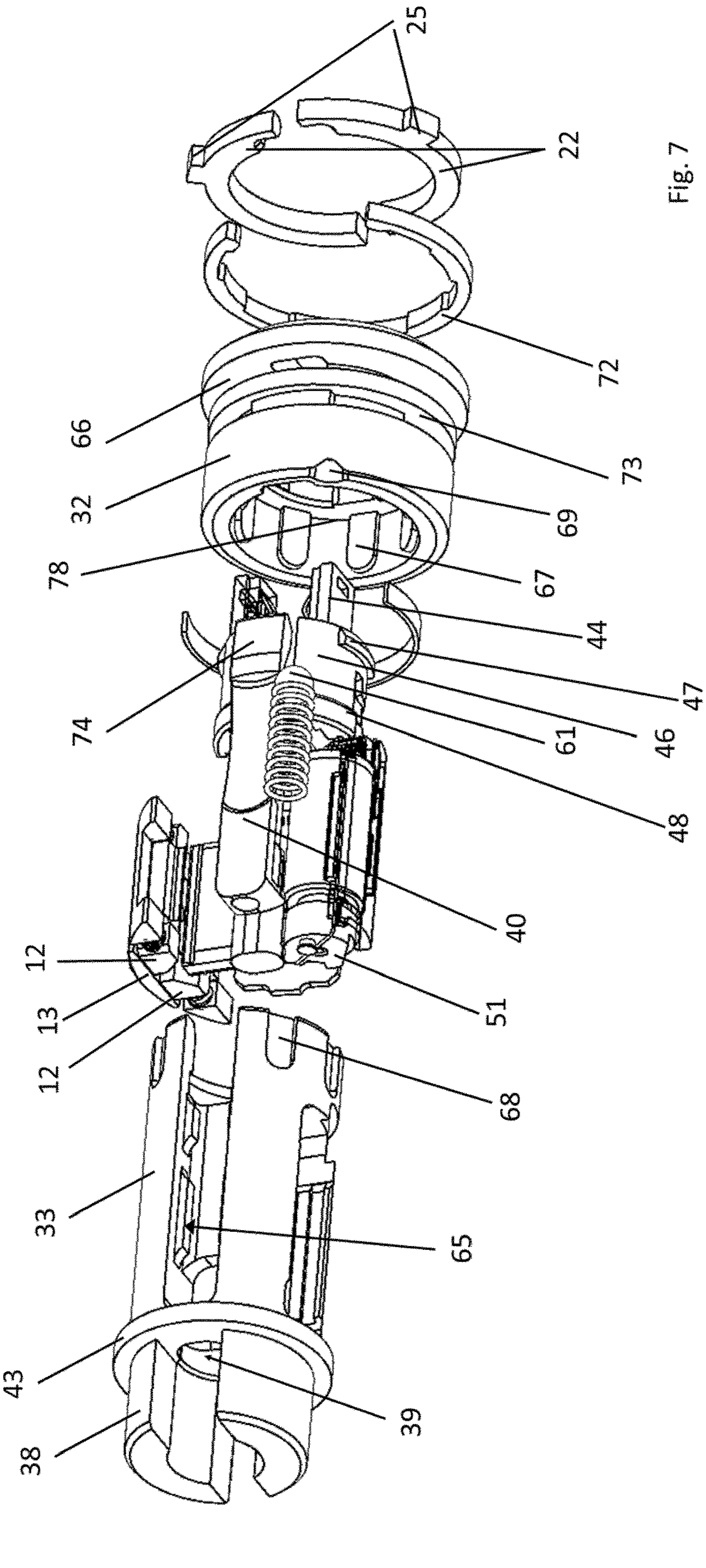
Figure 8:
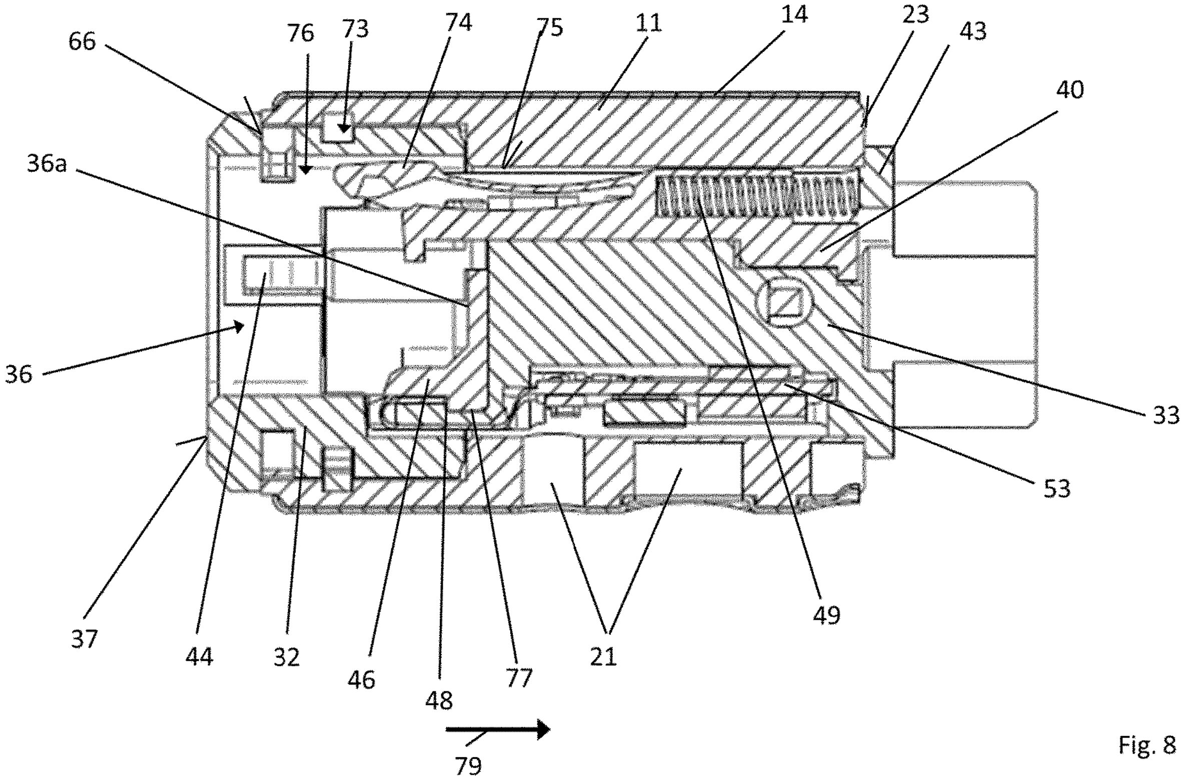
Figure 9:
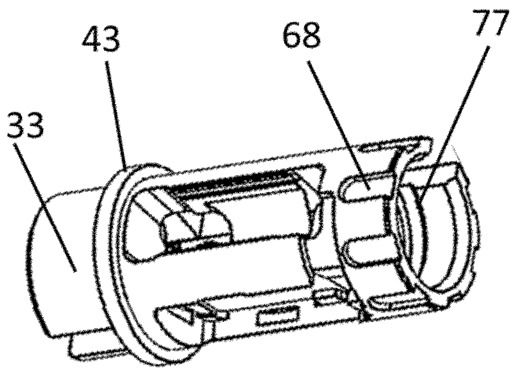

FIGS. 7 to 9 show a further exemplary embodiment of a barrier device 1 designed as an installation device. Unless described below, the second exemplary embodiment corresponds to the first exemplary embodiment.

FIG. 7 thereby shows the installation device 1 without cover 14 and stator body 11 in a partially dismantled state. FIG. 8 shows a sectional representation.

Instead of the screw 24, the first rotor element 32 comprises fastening means 67 and the second rotor element 33 comprises corresponding fastening means 68, which engage in a form-fitting manner such that the first rotor element 32 and the second rotor element 33 are fastened to one another in a rotationally fixed manner. Here, the first and second fastening means 67, 68 are designed as projections and corresponding recesses.

Instead of the coil as a transmission device 44, contact elements are provided which transmit data and/or electrical energy to the barrier device 1 via an electrical contact with the key 200. The contact elements 44 are fastened resiliently on a housing 46.

The housing 46 also serves to axially fasten the rotor elements 32, 33 to one another. Thus, the housing 46 serves as a latching device. For this purpose, the housing 46 comprises a first latching element 47 which latches into the first rotor element 32. For this purpose, the first rotor element 32 comprises an edge 78. The housing 46 comprises a second latching element 48 which latches into the second rotor element 33. For this purpose, the second rotor element 33 comprises a groove 77 (see FIG. 9).

The end surface 66 does not rest on an inner contour of the stator 10, but on an outer surface of the stator 10. As a result, the first rotor element 32 is fixed in the direction of arrow 79. Additionally or alternatively, the first rotor element 32 is axially fixed by a snap ring 72, both in the direction of arrow 79 and against the direction of arrow 79. The snap ring 72 is arranged in a groove 73 of the first rotor element 33.

The latching element 61 is arranged in the stator 10 and engages into a recess 69 of the first rotor element 32.

As in the first exemplary embodiment, the extension element 40 is moved into the removal position by the spring 49. In addition, the extension element 40 comprises a resilient engagement element 74. The engagement element 74 is provided to engage into the key 200. By engaging the engagement element 74 in the key 200, the extension element 40 can be moved from the insertion position to the removal position when the key is removed.

The engagement of the engagement element 74 takes place in that the engagement element 74 in the insertion position rests on an inner side 75 of the stator body 11 against the resilient effect of the engagement element 74 and is pushed to engage in the key 200. In the removal position, which is represented in FIG. 8, the engagement element 74 is located in a cavity 76 in the interior of the first rotor element 32. This makes it possible for the engagement element 74 to slide out of the key 200 due to the resilient force and/or chamfers.

The cavity 76 merges into the key channel 36.

As represented in FIG. 7, the key channel 36 ends with a wall **36*a*. As represented in FIG. 8, only a part of the extension element 40, which is designed to interact with the key 200, projects into the key channel 36. The wall 36*a* is substantially closed except for a section which is necessary for the extension element 40 to protrude into the key channel. Because the extension element 40 is designed to be filigree, at least with the part of the extension element 40 that projects into the key channel 36, the wall 36*a* can close off the key channel 36 and protect the components located behind it, namely the barrier element 31, the blocking element 51, the actuator 52 and the control device 53. The key channel 36** can be made to be correspondingly short.

FIG. 9 shows the second rotor element 33. Here, a groove 77 is represented, which is designed to engage with the latching element 48. The groove 77 also serves as a predetermined breaking point. In the event of a manipulation attempt, the second rotor element 33 breaks apart at the groove 77, with the essential part of the second rotor element 33 with the control device 53 and the actuator group 50 remaining in the stator 10.

The installation device 1 according to the first or second exemplary embodiment can also be used in other locking devices, for example in a half cylinder, a knob cylinder, a furniture cylinder or a padlock.

It is conceivable that the coupling part 41 is missing in the installation device 1 according to the disclosure. Rather, locking devices according to the disclosure can be provided in which the driver 103 is rigidly fastened to the rotor 30. The driver 103 can also serve as a bolt itself, e.g. in a furniture lock. The driver 103 and the insert 105 can be formed integrally with each other.

The stator insert element 13 and the stator body 11 can be formed in one piece. It is also conceivable that the cover 14 is missing and the stator body is fastened directly in the locking device housing 101.

In a further alternative of the disclosure, the barrier device 1 is not designed as an installation device 1. Rather, the stator 10 is designed as a locking device housing 101. Thus, the rotor 30 can be designed to be inserted directly into a locking cylinder housing 101. The locking device housing 101 then assumes the function of the stator 10.

It may be that the actuator moves the blocking element back into the blocking position. This can be provided in particular for knob cylinders.

The blocking element 51 can alternatively be designed in the shape of a plunger. In this case, a preferably bistable magnet is used as the actuator. The plunger can be spring-loaded in one direction, preferably away from the magnet.

Elements of the first exemplary embodiment can be implemented in the second exemplary embodiment and vice versa. For example, the second exemplary embodiment can comprise a coil as the transmission device 44 or the first exemplary embodiment can comprise contact elements as the transmission device 44. For example, the rotor elements 32, 33 of the first exemplary embodiment can be fastened to each other as in the second exemplary embodiment. The extension element 40 of the first exemplary embodiment and the second exemplary embodiment can be interchanged. The axial fixing of the first rotor element 32 with respect to the stator can be carried out according to the first or second exemplary embodiment.

The design of the disclosure is not restricted to the preferred exemplary embodiment indicated above. In fact, a number of variants is conceivable which make use of the represented solution even in the case of fundamentally different designs. All features and/or advantages emerging from the claims, the description or the drawings, including constructive details or spatial arrangements, may be essential to the disclosure even in the most varied combinations.

The invention claimed is:

1. A barrier device for a locking device comprising:
a stator,
a rotor with a rotor axis and
an electromechanical actuator in the rotor, wherein
the rotor has a first rotor element and a second rotor element, wherein
the first rotor element and the second rotor element are arranged axially one behind the other in relation to the rotor axis,
the first rotor element and the second rotor element are connected to each other in a rotationally fixed manner,
wherein the electromechanical actuator is arranged in one of the rotor elements,
wherein the barrier device comprises a barrier element, wherein in a first position the barrier element prevents the rotor from being rotatable with respect to the stator, wherein in a second position the barrier element enables the rotor to be rotatable with respect to the stator, wherein the barrier element is moved between the first and the second position,
wherein the second rotor element is designed to be arranged in the installed state between a driver of the locking device and the first rotor element, wherein the second rotor element comprises the electromechanical actuator and/or a control device for controlling the actuator.

2. The barrier device according to claim 1,
wherein the stator has a base side which is designed to be directed inwards and/or towards a driver of the locking device in the installed state, wherein the second rotor element and the base side are designed in such manner that the second rotor element is only inserted into the stator from the base side, wherein the second rotor element is inserted into the stator from the base side without the first rotor element.

3. The barrier device according to claim 1,
wherein the second rotor element is designed to be arranged in the installed state behind the first rotor element and/or between a driver and the first rotor element, wherein the second rotor element comprises a projection, wherein the projection is formed integrally with the rest of the second rotor element, wherein the axial position with respect to the stator is fixed in one spatial direction by the projection.

4. The barrier device according to claim 1,
wherein a section of the stator surrounding the second rotor element has a greater wall thickness than a section of the stator surrounding the first rotor element and/or wherein the first rotor element has a larger diameter than the second rotor element.

5. The barrier device according to claim 1,
wherein the first rotor element and/or the second rotor element are designed to be cylindrical, wherein the second rotor element protrudes into the first rotor element.

6. The barrier device according to claim 1,
wherein the first rotor element is made of a different material, of a harder and/or stronger material, than the second rotor element, wherein the first rotor element is formed from a ceramic material and/or wherein the first rotor element serves as a drilling protection.

7. The barrier device according to claim 1,
wherein the first rotor element detaches from the second rotor element under mechanical stress, wherein the second rotor element comprises a predetermined breaking point.

8. The barrier device according to claim 1,
wherein the barrier device has a latching element for latching in at least one position of the rotor with respect to the stator and/or a removal protection element for preventing removal of a key in at least one position of the rotor with respect to the stator, wherein the latching element and/or the removal protection element is arranged on the first rotor element or interacts with the first rotor element.

9. The barrier device according to claim 1,
wherein the barrier device comprises an extension element, wherein the extension element is designed to move in a first direction axially to the rotor axis, when a key is inserted, and to move in a second direction counter to the first direction axially to the rotor axis when the key is removed, wherein the extension element extends from the first rotor element to the second rotor element, wherein the first rotor element radially surrounds the extension element.

10. The barrier device according to claim 1, wherein the barrier element is movably mounted in the rotor, wherein the stator comprises a barrier element recess into which the barrier element engages in the first position, wherein the barrier element recess is provided in the part of the stator which surrounds the second rotor element.

11. The barrier device according to claim 1,
wherein the stator comprises a stator element, wherein the stator element has a first contact surface in order to move the barrier element of the barrier device from a first position into a second position, and the stator element is movably mounted in the rest of the stator.

12. The barrier device according to claim 1, wherein the barrier device comprises a key channel which is filled by a key in the inserted state, wherein the electromechanical actuator is located behind the key channel.

13. The barrier device according to claim 1, wherein the first rotor element and the second rotor element are reversibly detachably connected to each other, wherein the barrier device comprises a latching device, wherein the first rotor element and the second rotor element are connected to each other via the latching device.

14. The barrier device according to claim 1, wherein the stator comprises an opening which is designed to receive a fastening element passed through the locking device housing for the rotationally fixed fastening of the stator to the locking device housing, wherein the opening is arranged radially to the second rotor element.

15. A locking device with a locking device housing and a barrier device, wherein the barrier device comprises a stator, a rotor with a rotor axis, and an electromechanical actuator in the rotor, wherein the rotor has a first rotor element and a second rotor element, wherein the first rotor element and the second rotor element are arranged axially one behind the other in relation to the rotor axis, the first rotor element and the second rotor element are connected to each other in a rotationally fixed manner, wherein the electromechanical actuator is arranged in one of the rotor elements, wherein the barrier device comprises a barrier element, wherein in a first position the barrier element prevents the rotor from being rotatable with respect to the stator, wherein in a second position the barrier element enables the rotor to be rotatable with respect to the stator, wherein the barrier element is moved between the first and the second position, wherein the barrier device is received in the locking device housing, wherein the locking device comprises a fastening element, wherein the fastening element is introduced from the outside into the locking device housing in order to fasten the stator to the locking device housing in a rotationally fixed manner, wherein the locking device is designed as a locking cylinder, a knob cylinder, a furniture cylinder, or a padlock.

* * * * *